United States Patent [19]

Suzuki

[11] Patent Number: 5,223,999
[45] Date of Patent: Jun. 29, 1993

[54] RECORD HOLDER FOR A MAGNETO-OPTICAL RECORDING DEVICE WITH A RETRACTABLE MAGNETIC HEAD

[75] Inventor: Tsuneo Suzuki, Mönchweiler, Fed. Rep. of Germany

[73] Assignee: Deutsche Thomson Brandt GmbH, Villingen-Schweinnigan, Fed. Rep. of Germany

[21] Appl. No.: 880,936

[22] Filed: Mar. 3, 1992

[30] Foreign Application Priority Data

Aug. 24, 1989 [DE] Fed. Rep. of Germany ....... 3927903

[51] Int. Cl.⁵ .......................... G11B 13/04; G11B 5/54
[52] U.S. Cl. ................. 360/105; 360/99.06; 369/13
[58] Field of Search ............ 360/105, 109, 114, 99.06, 360/104; 369/13, 258, 257, 270, 75.2

[56] References Cited

U.S. PATENT DOCUMENTS

| | | | |
|---|---|---|---|
| 4,660,111 | 4/1987 | Morimoto | 360/105 |
| 4,740,937 | 4/1988 | Watanabe | 369/270 |
| 4,742,409 | 5/1988 | Koyahara | 360/105 |
| 4,839,757 | 6/1989 | Shigei et al. | 360/105 |
| 5,058,094 | 10/1991 | Suzuki | 369/75.2 |
| 5,103,435 | 4/1992 | Nemoto et al. | 360/114 X |

Primary Examiner—Stuart S. Levy
Assistant Examiner—Joseph A. Rhoa
Attorney, Agent, or Firm—J. S. Tripoli; E. P. Herrmann; L. L. Hallacher

[57] ABSTRACT

A holding device for holding a record (CD) in a magneto-optical recording/playback device includes a first wheel (R1) pressing against one side of the record. A first pivotable arm (AR1) supports a second wheel (R2), motion of the first arm moves the second wheel against the other side of the record and also centers the record in the holding device. A second pivotable arm (AR2) supports a magnet (M). A lever includes a third pivotable arm (AR3) mounted on an axis (A3) supported by the first pivotable arm and is in contact with the second arm. A fourth pivotable (AR4) arm pivots in a direction opposite from that of the third pivotable arm. A stop (AS) is in the proximity of the fourth pivotable arm. Accordingly, motion of the first arm (AR1) away from the record causes the third arm (AR3) to force the second arm (AR2) away from the record and also causes the fourth arm (AR4) to hit the stop (AS) and cause the third arm to move the second arm further and the magnetic head (M) away from the record.

4 Claims, 3 Drawing Sheets

RECORD HOLDER FOR A MAGNETO-OPTICAL RECORDING DEVICE WITH A RETRACTABLE MAGNETIC HEAD

This is a continuation of PCT application PCT/EP 90/1339 filed Aug. 16, 1990 by Tsuneo Suzuki and titled "Record Holder For A Magneto-Optical Recording Device with a Retractable Magnetic Head."

This invention is directed to a record holding device for a magneto-optical recording and/or reproducing set in which one side of the record is held by a first wheel. A first arm, which is located on the other side of the record, supports a second wheel and can be swiveled about axis to contact the first wheel and center the record. An electromagnet is provided to reverse the magnetism of the record.

In a magneto-optical recording and/or reproducing set the information bearing record is pressed by a first wheel, which is mounted to a swivel arm, against a second wheel, which is rigidly connected to the housing, to center the record on the record drive. One of the two wheels, typically the wheel mounted to the housing, is driven by a motor. One side of the record, for instance the lower side, is scanned by an optical scanning device. An electromagnet is positioned as near as possible to the other surface of the record to reverse the magnetization of the magnetic domains of the record.

A holding device for a record in a magneto-optical recording and/or reproduction (playback) device is described in U.S. Pat. No. 4,740,937. The record is held on one side by a first wheel. On the other side of the record, a first arm has a second wheel which is run on bearings. The arm is pivotable about an axis into contact with the first wheel in order to center the record. An electromagnet, mounted on a second arm, is provided for reversing the magnetization of the record, and the second arm can be rotated around an axis against the record.

When the record is inserted into, or withdrawn from, the record holder the electromagnet must be away from the record a sufficient distance to assure that the electromagnet does not touch the record and scratch, or otherwise damage, its sensitive surface. The invention provides a record holder for a magneto-optical recording and/or reproducing device which prevents the electromagnet from contacting and damaging the prevents the electromagnet from contacting and damaging the surface of the record during loading an unloading. With the invention, the electromagnet is mounted on an arm, which can be pivoted relative to the record. A lever is pivotable about an axis in a first arm of the lever. The arm which supports the electromagnet rests against one arm of the lever. A stop is provided for the other arm of the lever. When the first arm of the lever pivots away from the record the lever arm which rests against the arm which supports the electromagnet is moved away from the record. However, the first arm of the level contacts the stop and further pivots the magnet supporting lever away from the record to further space the magnet and the record.

Figure 1:
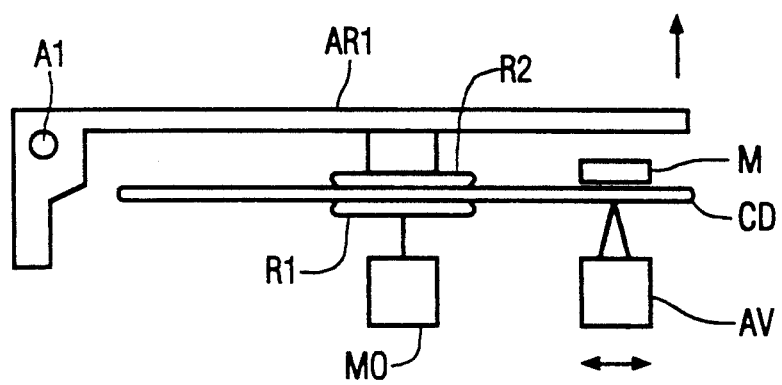
FIG. 1 is a side-view of a preferred embodiment of a holding device with a record in the play position.

In FIG. 1, a record CD is pressed against a wheel R1 by a wheel R2. The wheel R2 is supported by an arm AR1, which can be swivelled about an axis A1 to center the record in the record holder. The wheel R1 is driven by a motor MO. The lower side of record CD is scanned by an optical scanning-device (pickup) AV. An electromagnet M is arranged above the upper side of the record CD and is used to reverse the direction of magnetization of the magnetic domains in the record CD. During operation the electromagnet M and the optical scanning device AV move radially along the record CD, as indicated by the double arrow.

Figure 2:
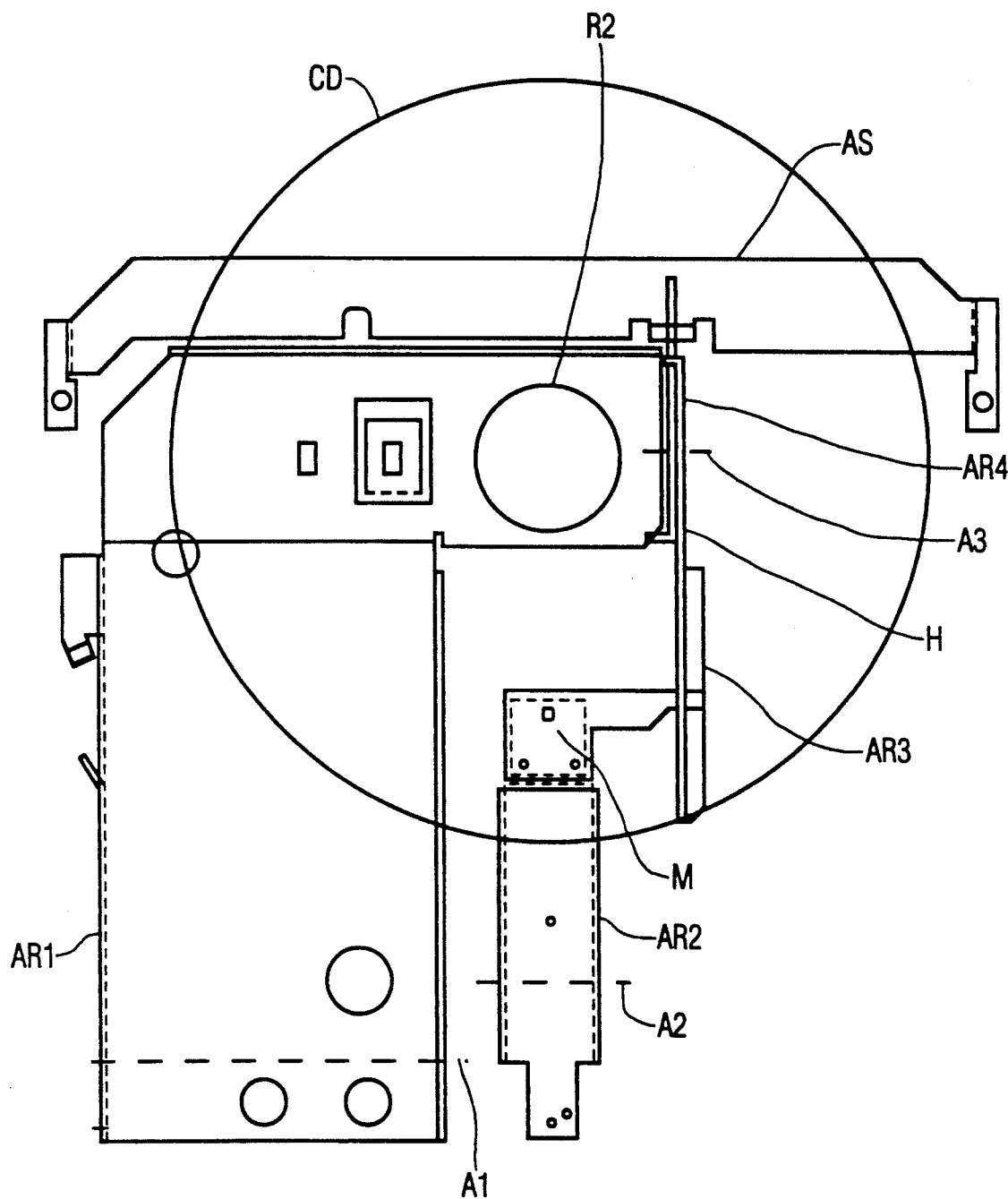
FIG. 2 is a top-view of the preferred embodiment of FIG. 1.

In FIG. 2, the arm AR1 supports the wheel R2 and can be swivelled about an axis A1. The magnet M, shown in dotted lines, is mounted to an arm AR2, which can be pivoted about an axis A2. A lever H is rotatable and is arranged in the proximity of the arm AR1. The arm AR2, which supports the electromagnet M, rests on one arm AR3 of the lever H. The other arm A4 of the lever H is provided with a stop AS.

Figure 3:
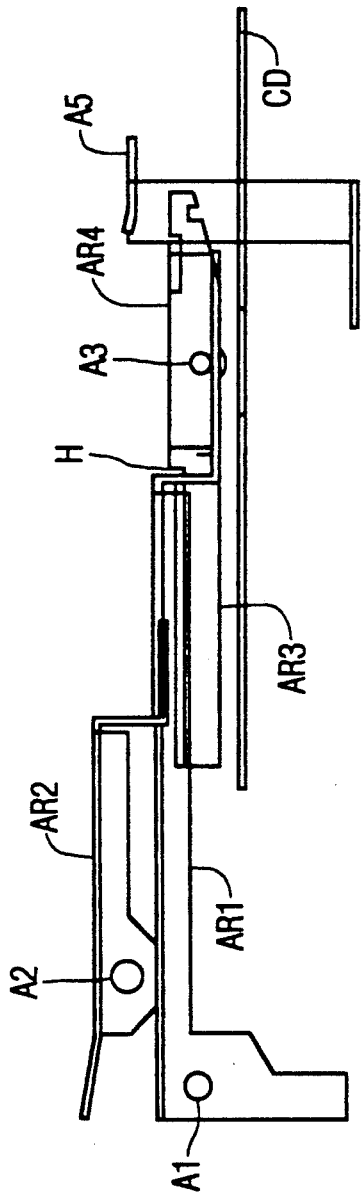
FIG. 3 is a side-view of the preferred embodiment example in a record insert-remove state.

FIG. 3 is a side-view in which the arm AR1 and the record CD are in the reproduction position. During the reproduction and search operations the arm AR2 slides on arm AR3 of the lever H, which is parallel to the surface of the record during the reproduction and search operations. The arm AR2 can be resiliently biased against the arm AR3 of the lever H by a spring.

Figure 4:
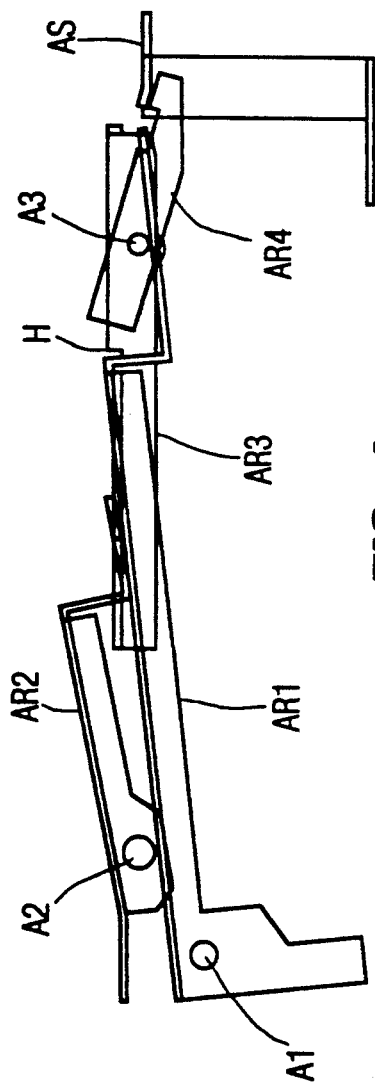
FIG. 4 is a side-view of the preferred embodiment in a record play state.

FIG. 4 shows the positions of the arms AR1, AR2, AR3, and AR4 when a record is to be inserted into or withdrawn from the record holding device. The arms AR3 and AR4 of the lever H are constructed to rotate in opposite directions. A spring, not shown, holds (or biases) arms AR3 and AR4 in parallel when in the reproduction position. As shown in FIG. 4, the arms AR3 and AR4 are oppositely rotated when the record holder is in the load-unload state. This provides the advantage that the arm AR1 can be further lifted without also raising the arm AR2, which supports the magnet.

During loading and unloading of the record holder the arm AR1 is pivoted in the direction indicated by the arrow in FIG. 1. The arm AR3 of the lever H therefore presses the arm AR2 which supports the electromagnet H, upwardly. However, because the arm AR4 of the lever H impacts the stop AS, the lever H pivots about its axis A3 and the arm AR3 of the lever H presses the arm AR2 upwardly and further off the record CD. Accordingly, during loading and unloading of a record, a sufficiently large distance is maintained between the electromagnet and the record to avoid scratching the electromagnet M.

The invention is intended for use in magneto-optical recording-and/or reproducing-sets. The record be oriented in the record holder either horizontally or vertically.

I claim:

1. A holding device for holding a recording disc (CD) in a recording/playback device comprising:
   a first wheel (R1) pressing against one side of the disc;
   a first pivotable arm (AR1), pivotable toward and away from the disc, supporting a second wheel (R2) and for pivoting said second wheel against the other side of said disc and to center said record (CD) in said holding device in conjunction with the first wheel (R1);

a second pivotable arm (AR2), pivotable toward and away from the disc, supporting a magnet head (M) for generating a magnetic field proximate the disc;

a lever (H), including a third pivotable arm (AR3) mounted on an axis (A3) supported by said first pivotable arm (AR1) and supporting said second arm (AR2), and a fourth pivotable arm (AR4) which pivots in conjunction with and in a direction opposite from that of said third pivotable arm; and a stop (AS) for stopping said fourth pivotable arm (AR4), wherein motion of said first pivotable arm (AR1) away from the disc causes said third pivotable arm (AR3) to force said second pivotable arm (AR2) and the magnet (M) away from said disc and said fourth pivotable arm (AR4) to hit said stop (AS) and cause said third pivotable arm (AR3) to move said second pivotable arm (AR2) further away from said disc.

2. The holding device of claim 1 wherein said second arm is resiliently biased against said third arm.

3. The holding device of claim 2 wherein said lever is parallel to the surface of said record when a record is held in said holding device.

4. The holding device of claim 3 wherein said third and fourth arms are rotatable relative to each other and further including a biasing means for holding said third and fourth parallel to one another when a record is held in said holding device.

* * * * *